(12) United States Patent
Hetzel

(10) Patent No.: US 11,996,621 B1
(45) Date of Patent: May 28, 2024

(54) BOUNDARY CHOKE BETWEEN MODULES IN PHASED ARRAY ANTENNAS

(71) Applicant: Amazon Technologies, Inc., Seattle, WA (US)

(72) Inventor: Peter James Hetzel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/742,323

(22) Filed: May 11, 2022

(51) Int. Cl.
*H01Q 21/06* (2006.01)
*H01Q 1/22* (2006.01)
*H01Q 1/38* (2006.01)
*H01Q 1/42* (2006.01)
*H04B 1/10* (2006.01)

(52) U.S. Cl.
CPC ......... *H01Q 21/065* (2013.01); *H01Q 1/2283* (2013.01); *H01Q 1/38* (2013.01); *H01Q 1/422* (2013.01); *H04B 1/1018* (2013.01)

(58) Field of Classification Search
CPC ...... H01Q 21/065; H01Q 1/2283; H01Q 1/38; H01Q 1/422; H01Q 21/08; H01Q 9/0407; H01Q 1/28; H04B 1/1018; H05K 2201/10098; H05K 1/0243; H01L 2223/6677; H01L 23/66; H01L 21/4857; H01L 2223/6605

See application file for complete search history.

(56) References Cited

U.S. PATENT DOCUMENTS

| | | | | |
|---|---|---|---|---|
| 2018/0145421 | A1* | 5/2018 | Yoon | H01Q 21/065 |
| 2019/0304936 | A1* | 10/2019 | Shaul | H01L 24/20 |
| 2021/0351518 | A1* | 11/2021 | Gorbachov | H01Q 1/2208 |
| 2022/0263228 | A1* | 8/2022 | Cho | H01Q 21/08 |
| 2022/0263229 | A1* | 8/2022 | Cho | H01Q 9/0485 |

* cited by examiner

*Primary Examiner* — David E Lotter
(74) *Attorney, Agent, or Firm* — Lowenstein Sandler LLP

(57) ABSTRACT

Technologies directed to a radio frequency (RF) boundary choke between modules in phased array antennas. An antenna module may include a circuit board having one or more conducting layers and one or more electrically insulating layers. The antenna module may include an antenna disposed on a first surface of the circuit board. The antenna module may further include radio frequency front end (RFFE) circuitry disposed on a second surface of the circuit board. The antenna module further includes a first set of vias extending between the antenna and the RFFE circuitry and a second set of vias disposed within the circuit board. Each of the second set of vias is positioned along a first axis parallel to and a first distance from a first edge of the antenna module.

18 Claims, 9 Drawing Sheets

BOUNDARY CHOKE BETWEEN MODULES IN PHASED ARRAY ANTENNAS

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. To communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies directed to a radio frequency (RF) boundary choke between modules in phased array antennas are provided. One antenna module may include a set of vias each disposed within a circuit board and positioned a distance from (e.g., in a line) an inter-module gap (e.g., a physical distance between antenna modules) between two antenna modules. The set of vias may effectively form an inductor that reduces effects (e.g., performance degradation) that the resonant fields within inter-module modules gaps have on operational components of the antenna module (e.g., antenna elements, radio frequency front-end (RFFE) circuitry, vias coupled between the antenna elements and the RFFE circuitry). Each antenna module of an array of antenna modules may include similar sets of vias on multiple boundaries (e.g., edges such as a first edge, a second edge, etc.) of the corresponding modules to insulate corresponding interior circuitry (e.g., vias coupled to antenna elements and RFFE circuit associated with carrying out operations of the antenna module) from interference occurring from other antenna modules (e.g., neighboring antenna modules), resonant signal propagating within inter-module gabs (e.g., standing resonant fields), and the rest of the environment. For example, a first antenna module may have a first edge that forms a first boundary of an inter-module gap and a second antenna may have a second edge that forms a second boundary of the inter-module gap.

In some cases, phased arrays can be composed of many antennas in packaged modules positioned in an array (e.g., arranged in a grid). Shortcomings in conventional assembly and manufacturing processes of the physical array of packaged modules may result in gaps between the individual modules (e.g., ranging from 200 um to 1000 um in width). However, the physical gap ("inter-module gaps") may result in poor antenna performance due in part to resonant electromagnetic behavior in the gaps between modules. Additionally, variations in the physical gap can significantly affect antenna performance.

Aspects of the present disclosure overcome the deficiencies of the conventional solution by providing a choke structure within a series of boundary vias surrounding the module. The choke structure acts as an inductor and reduces effects from resonant fields between the inter-module gaps, which can greatly improve the overall performance of an array antenna (e.g., phased array antenna). The performance degradation due to inter-module gaps may be mitigated.

Figure 1A:
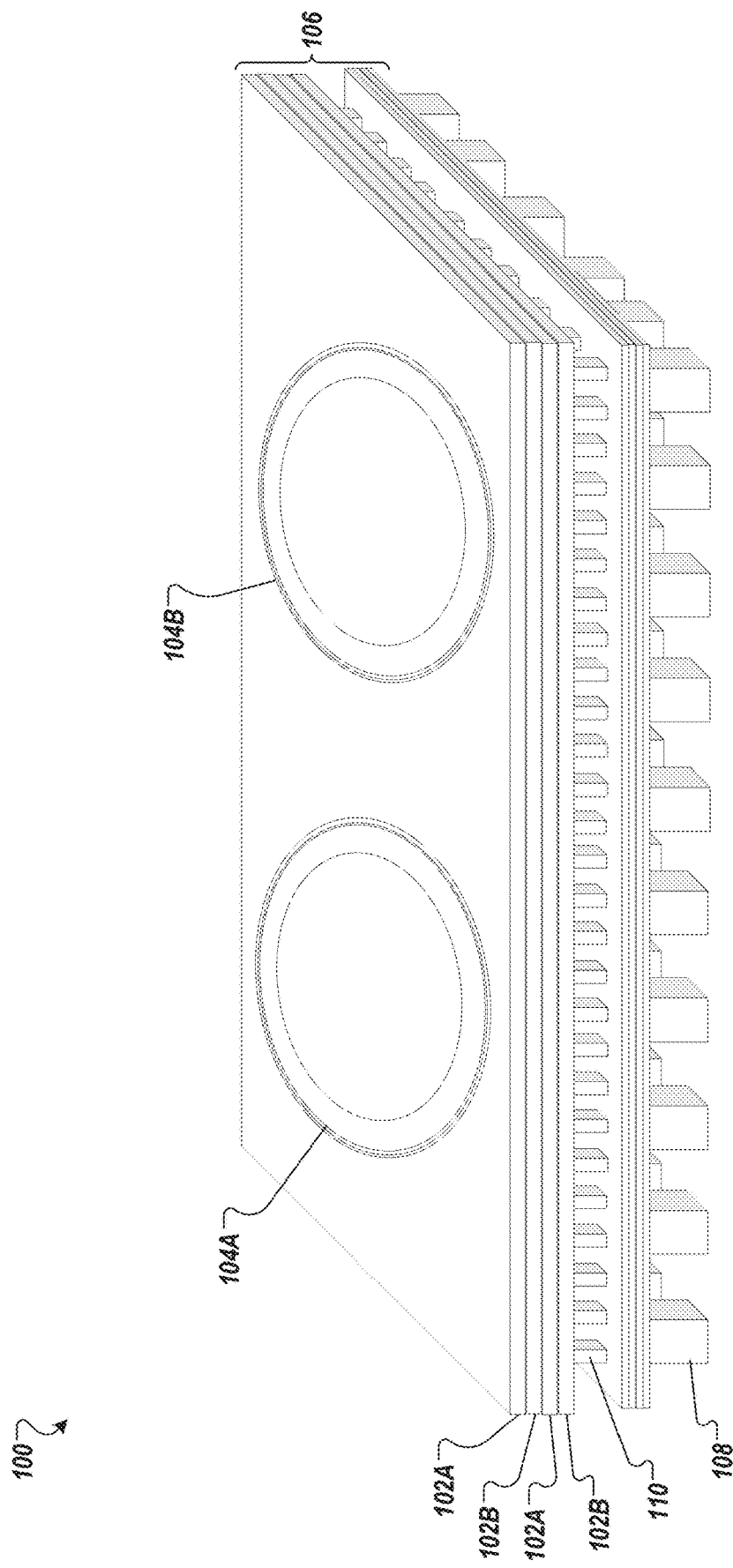
FIG. 1A is a perspective view of an antenna module with a boundary RF choke and RF shield according to at least one embodiment.

In at least one embodiment, a communication system may include a support structure and an antenna module coupled to the support structure. The antenna module may include a circuit board with one or more conducting layers and one or more electrically insulating layers. The antenna module may include an antenna disposed on a first surface of the circuit board. The antenna module may include an RFFE circuitry disposed on a second surface of the circuit board. The antenna module further includes a first set of vias coupled between the antenna and the RFFE circuitry. The antenna module further includes a second set of vias disposed within the circuit board. Each of the second set of vias is positioned a first distance from a boundary of the antenna module and effectively forms an inductor that shields operational components of the antenna module from the outside environment (e.g., resonant signals within the inter-module gaps). The antenna module may further include a third set of vias disposed within the circuit board. Each of the third set of vias is positioned a second distance, different from the first distance, from the boundary of the antenna module. The third set of vias is configured to shield the first set of vias from RF interference. FIG. 1A is a perspective view of an antenna module 100 with a boundary RF choke and RF shield according to at least one embodiment. Antenna module 100 can be part of an antenna array, such as a phased array antenna (not illustrated in FIG. 1). An array antenna can include tens, hundreds, or thousands of antenna elements. The antenna array can be made up of multiple antenna modules that are individually manufactured and assembled as the array antenna. For example, antenna elements, such as antenna elements 104A-B, can be built upon or supported by Printed Wiring Boards (PWBs) or Printed Circuit Boards (PCBs). A PWB is similar to a PCB, but without any components installed on it. The antenna modules can be manufactured using one of several techniques, including Organic substrate PWB and Low-Temperature Cofired Ceramic (LTCC) circuits. The antenna modules are often very closely spaced between each other, preventing the insertion of any other component between them. The antenna modules can be attached to another substrate, such as a PWB, or structure. Each antenna module can incorporate an integer number of antenna elements.

The antenna module 100 includes a circuit board 106 that forms and/or is further coupled to one or more support structures that further couple to one or more components of a space vehicle (e.g., a chassis of a space vehicle) using surface mount packaging 108 (e.g., a solder ball, a ball grid array (BGA), etc.). The space vehicle can be a satellite, a high-altitude vehicle, a space station, or the like. Alternatively, the chassis can be part of other structures. The support structure and/or surface mount packaging 108 may be electrically grounded. The circuit board 106 includes one or more conducting layers 102A (e.g., metal layers such as, for example, copper) and electrically insulating layers 102A-B (substrate, air, dielectric, ceramic, etc.). One or more antenna elements 104A-B are located on a first surface of the circuit board 106, and RFFE circuitry and/or an integrated circuit (e.g., radio) are located on a second surface of the circuit board 106. The integrated circuit includes RF circuitry coupled to the antenna element 104 through a first via (not shown) in the circuit board 106. The integrated circuit is also coupled to the support structure (e.g., through surface-mount packaging 108).

In at least one embodiment, the one or more antenna elements 104A-B may include a low-profile antenna mounted on a first surface of circuit board 106. In another embodiment, the antenna elements 104A-B may be formed on a first surface (e.g., a top surface) of the circuit board. The antenna elements 104A-B may include a planar rectangular, circular, triangular, or any geometrical sheet or patch (e.g., patch antennas) of conducting material (e.g., a metal) mounted over a larger conductor referred to as a ground plane.

In some embodiments, the one or more antenna elements 104A-B include a slot antenna that includes a metal surface (e.g., a flat metal surface) with one or more holes or slots removed (e.g., cut out). The slot antenna may radiate electromagnetic waves similar to a dipole antenna. The shape and size of the slot, in addition to the driving frequency, may determine the radiation pattern.

In at least one embodiment, the antenna module 100 includes an RF choke located between the first via (not shown) and an inter-module gap formed between two or more antenna modules. The RF choke includes a set of vias, each disposed within an insulating layer of the circuit board 106 and coupled to adjacent conducting layers of the circuit board 106. The set of vias may be disposed in a first arrangement (e.g., vias 142 of FIG. 1B). Each via of the set of vias may be positioned at a first distance from the inter-module gap. The first distance may correspond to a wavelength (e.g., a quarter wavelength choke, a three-quarter wavelength choke, etc.) of an operating frequency of the antennas 104A-B.

In at least one embodiment, the RF choke formed by the set of vias 110 operates as an RF open circuit at a distal end of the layer having the set of vias 110 when an effective distance is the specified wavelength (e.g., a quarter-wavelength or a three-quarter wavelength of the operating frequency of antennas 104A-B) and operates as an RF short circuit at a distal end of the layer housing the set of vias 110 for DC signals. In at least one embodiment, the RF choke formed by vias 110 effectively forms an inductor that mitigates performance degradation of the one or more antennas 104A-B caused by resonant fields within one or more inter-module gaps formed by the antenna module 100 and one or more neighboring antenna modules.

Figure 1B:
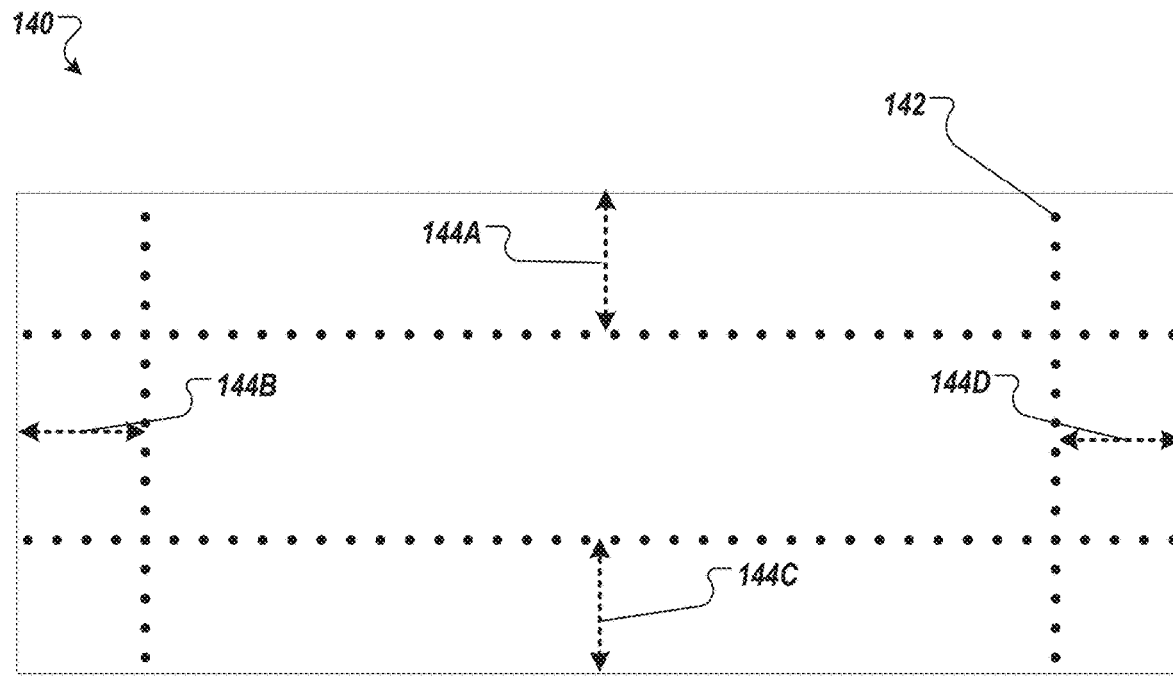
FIG. 1B illustrates a portion of an antenna module with an RF choke according to at least one embodiment.
Figure 1C:
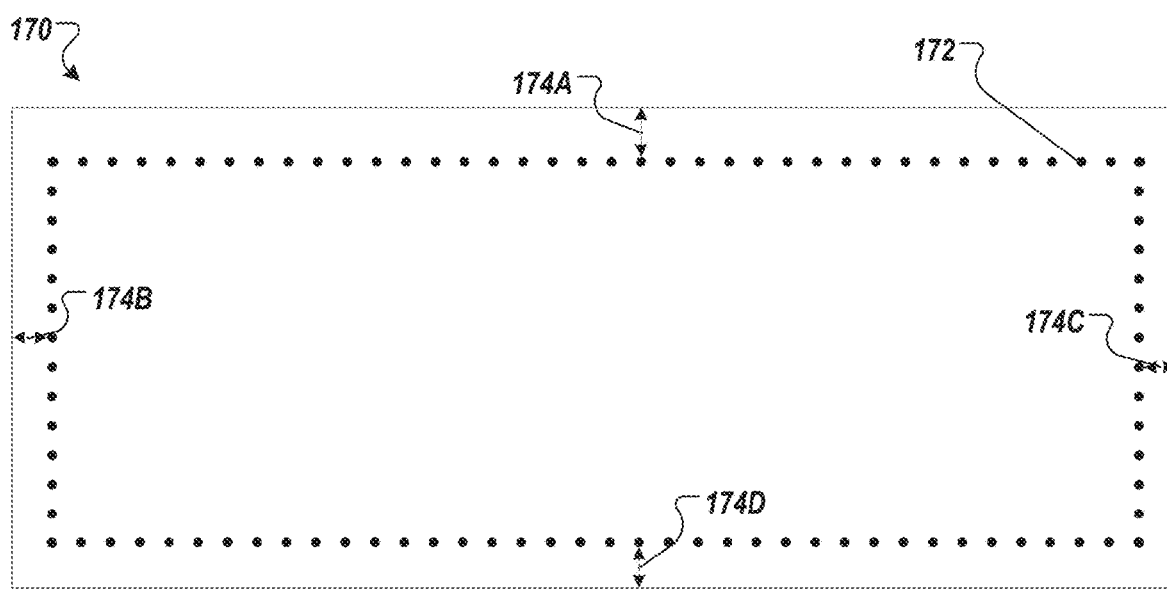
FIG. 1C illustrates a portion of an antenna module with an RF shield according to at least one embodiment.

In at least one embodiment, the antenna module may include one or more sets of vias (e.g., vias 110) disposed within the circuit board in a second arrangement (e.g., vias 172 of FIG. 1C). The set of vias may be disposed in an insulating layer of the circuit board and be coupled between adjacent conducting layers. Each via of the set of vias is positioned along a perimeter of the antenna module at a particular distance. The set of vias may form an RF shield. In at least one embodiment, the circuit board 106 is coupled to a support structure such as, for example, a chassis of another structure of another system, such as a space vehicle, a vehicle, a boat, a building, a dwelling, or the like, where the chassis or other physical structure is electrically grounded and the antenna module coupled to the support structure with the surface coupling packaging 108. An RF structure, similar to the RF choke described above, can include a set of vias disposed a distance from a boundary of the antenna module (e.g., an inter-module gap). A physical arrangement of the vias causes the RF structure to provide an electrically insulating gap between the vias coupled between antennas 104A-B and RFFE circuitry (not shown) and a boundary of the antenna structure (e.g., an inter-module gap) such as, for example, to mitigate interference arising from one or more neighboring antenna modules and the chassis at RF operating frequencies of the antenna. As described herein, the structure can be part of a satellite or other structures as described herein.

FIG. 1B illustrates a portion 140 of an antenna module with an RF choke according to at least one embodiment. The portion 140 of the antenna module may be a layer of the circuit board 106 (e.g., an electrically insulating layer disposed between adjacent conducting layers). The illustrated layer may be adjacent to a first conducting layer (e.g., behind the illustrated layer) and a second conducting layer (e.g., in front of the illustrated layer). The illustrated portion 140 of the antenna module includes a set of vias 142 that each couple to the first conducting layer and the second conducting, as previously described. The vias may include conducting members that, when arranged in a particular configuration (e.g., as seen in FIG. 1B), mitigate resonant signals (e.g., electrical and/or magnetic fields) that can influence operations of one or more components of the antenna module 100 (e.g., antennas 104A-B, RFFE circuitry, and/or vias coupled between antennas 104A-B and RFFE circuitry).

As shown in FIG. 1B, the vias 142 may be disposed in one or more lines corresponding to one or more edges of the portion 140 of the antenna structure. Each line may be positioned parallel to an edge of the antenna module. The antenna module may include a rectangular structure (e.g., having a rectangular surface), as shown in FIG. 1B, however, in some embodiments, the antenna module may be of a different shape, such as a triangular structure, a pentagon structure, a hexagon structure, and so forth. The antenna module may include circular portions with one or more vias 142 arranged in a concentric circle a distance from the edge of the antenna module.

As shown in FIG. 1B. the vias are disposed at a distance 144A-D from a corresponding edge of the antenna module. In some embodiments, the vias are positioned along an entire perimeter of the antenna module. However, in other embodiments, the vias may only be distributed along certain edges (e.g., edges that may be proximate to one or more neighboring antenna modules). In some embodiments, the vias 142 are disposed along (e.g., span) an entire dimension of the antenna module (e.g., from an edge to another edge). In other embodiments, the vias may halt at a particular distance from a neighboring edge.

The distances 144A-D at which the vias 142 are disposed from corresponding edges may all be the same across the entirety of the antenna module. This distance 144A-D may be associated with a frequency of operation of one or more antennas of the antenna module. For example, the distance 144A-D may be a quarter wavelength, three-quarter wavelength, or integer multiples of previously outlined distances.

FIG. 1C illustrates a portion 140 of an antenna module with an RF shield according to at least one embodiment. The portion 140 of the antenna module may be a layer of the circuit board 106 (e.g., an electrically insulating layer disposed between adjacent conducting layers). The illustrated layer may be adjacent to a first conducting layer (e.g., behind the illustrated layer) and a second conducting layer (e.g., in front of the illustrated layer). The illustrated portion 140 of the antenna module includes a set of vias 142 that couple to the first conducting layer and the second conducting, as previously described. The vias may include conducting members of an electrical signal to flow between proximately disposed conducting layers.

As shown in FIG. 1C, the portion 170 of the antenna module may include a set of vias 172. The set of vias 172 may be disposed in an electrically insulating layer (e.g., a substrate layer) in an arrangement (e.g., in one or more different layers than the set of vias discussed in FIG. 1B). The set of vias 172 may be coupled to adjacent conducting layers of the set of conducting layers. Each of the set of vias may be disposed along a perimeter of the first antenna module at a distance 174A-D from the edge of the antenna module. In some embodiments, the distance 174A-D may be uniform across all parts of the antenna module, however, in other embodiments, the distance 174A-D may vary at various points along the perimeter of the antenna module. The distance 174A-C may be smaller or larger than distance 144A-B (e.g., a first distance less than a second distance or a first distance greater than a second distance). For example, each via of the set of vias 172 may be positioned closer to the perimeter of the antenna module than each via of the set of vias 142. In some embodiments, the set of vias 172 forms an RF signal shield. RF shielding may be used to block RF interference outside a particular antenna module. The set of vias 172 formed along the perimeter creates an electrically conducting boundary that reduces the electric and magnetic transmission outside and inside the antenna module. For example, the RF shield may protect internal electronic devices such as antennas, integrated circuitry, and the like from RF interferences that may affect antenna module performance and functionality.

In some embodiments, multiple layers of circuit board 106 include the vias arranged as vias 172 and vias 142. For example, circuit board 106 may include one or more layers that include vias in a first arrangement (e.g., arranged as vias 172) and a layer having vias in a second arrangement (e.g., arranged as vias 142). In some embodiments, the circuit board 106 may include one or more layers with vias positioned in the first arrangement interleaved with one or more layers with the vias positioned in the second arrangement. Various circuitry, such as circuitry set of vias providing signals to and from antennas 104A, may be disposed within the various layers of the circuit board and may be shielded from RF interference. Further, the various layers may provide a boundary RF choke that mitigates the negative impact of neighboring antenna modules being disposed proximate particular antenna modules and causes degradation through inter-modules gaps formed by the relative positioning of neighboring antenna modules (e.g., standing resonant fields causing radio frequency (RF) degradation to RF signal communicated by antenna module 100).

Figure 2A:
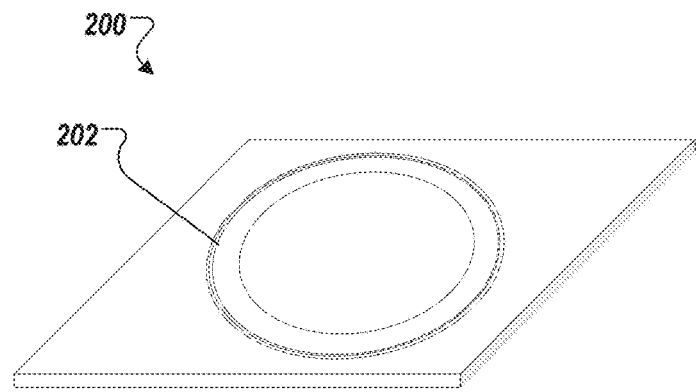
FIGS. 2A-B illustrate a surface of a circuit board with various antenna configurations of an antenna module according to at least one embodiment.
Figure 2B:
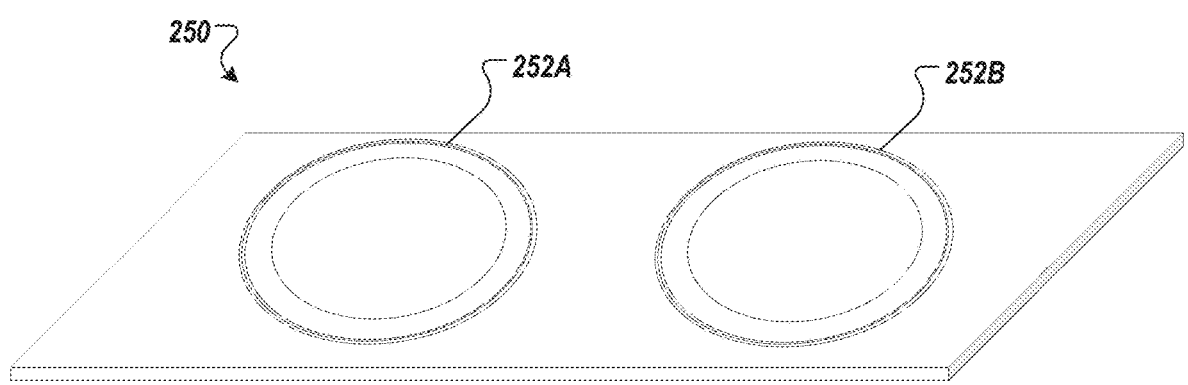

FIGS. 2A-B illustrate a surface of a circuit board with various antenna configurations of an antenna module according to at least one embodiment. As noted previously, each antenna may be positioned proximate to one or more neighboring antenna modules, and each module may include one or more antenna elements. The antenna module may form a rectangular structure, such as illustrated in FIG. 2A-B, however, in some embodiments, the antenna module may be of a different shape, such as a triangular structure, a pentagon structure, a hexagon structure (e.g., a honeycomb shape), and so forth. The antenna module may include circular portions with the vias and/or antennas disposed in one or more concentric circles with the larger antenna module structure.

In one embodiment, the one or more antenna elements 104A-B may include a low profile antenna that is mounted on a first surface of circuit board 106. In another embodiment, the antenna elements 104A-B may be formed on a surface of the circuit board. The antenna elements 104A-B may include a planar rectangular, circular, triangular, or any geometrical sheet or patch of conducting material (e.g., a metal) mounted over a larger conductor referred to as a ground plane.

Figure 3A:
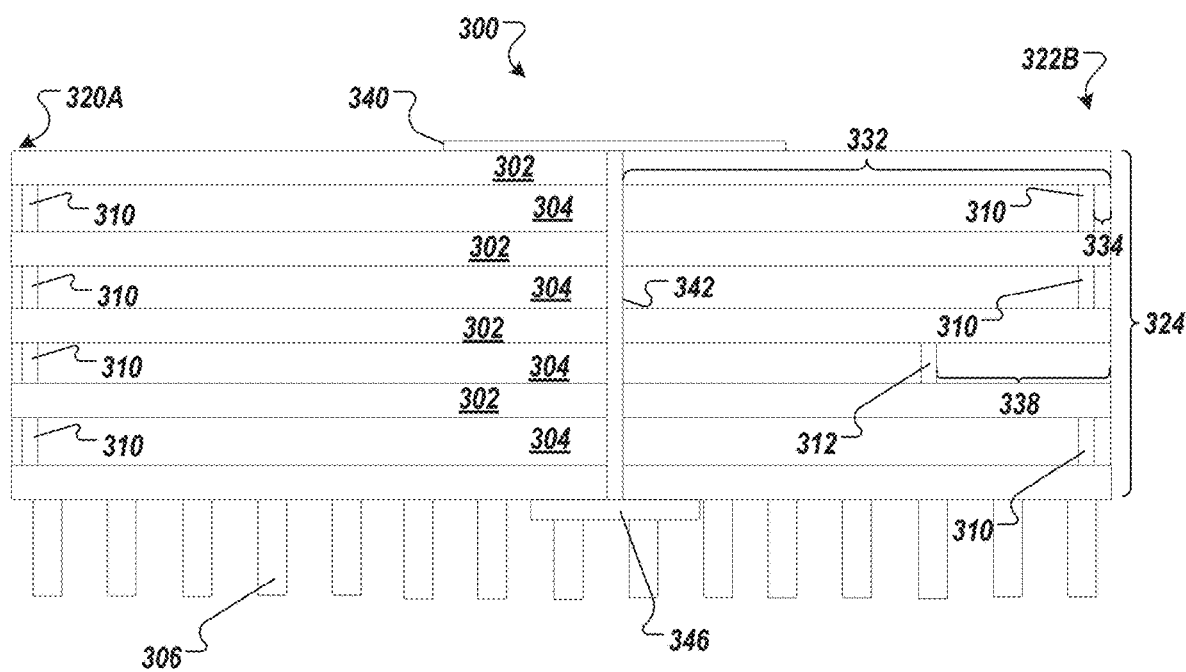
FIGS. 3A-B illustrate side views of antenna modules according to at least one embodiment.
Figure 3B:
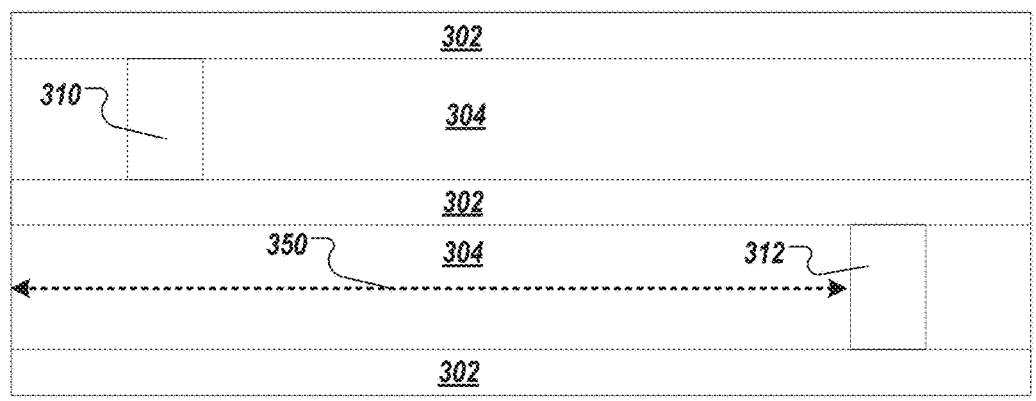

FIGS. 3A-B illustrate side views of antenna modules 300A-B according to at least one embodiment. As shown in FIG. 3A, the antenna module 300 includes a circuit board 324 with interleaved conducting layers 302 and electrically insulating layers 304 (e.g., substrate layers, air layers, dielectric layers, etc.). A first side 320A of the antenna module illustrates vias 310 being disposed a common distance from a boundary of the antenna module. The arrangement of the vias may form an RF shield along a boundary perpendicular to the one or more layers (insulating layers 304 and conducting layers 302) of the circuit board 324. On a second side, the vias 310 are disposed a common distance from a boundary of the antenna module 300. However, in one layer, the vias 312 are disposed at a different distance from a boundary of the antenna module 300. For example, in one or more layers of the circuit board 324, one or more arrangements of vias, as described in association with FIGS. 1B-C, may be used.

As shown in FIG. 3A, the antenna module 300 may include one or more antenna elements 340, RFFE circuitry 346, integrated circuitry (not shown), and a set of one or more vias 342 coupled between the antenna element 340 and the RFFE circuitry 346. In some embodiments, the RFFE is coupled to one or more RF circuitry components such as, for example, resistors, capacitors, and RF radios, to receive and transmit RF signals.

As shown in FIG. 3A, a first via (e.g., of a first set of vias) 342 may be a distance 332 from an edge of the antenna module 300. A second via 310 may be a distance 334 from the edge of the antenna module 300. A third via 312 may be a distance 338 from the edge of the antenna. Each of via 310 and via 312 may be disposed along an axis (e.g., into and out of the page) at a corresponding distance (e.g., distance 334 and distance 338) from the edge.

FIG. 3B illustrates a portion of a circuit board of an antenna module with a set of conducting layers 302 and a set of insulating layers 304 (e.g., a pair of electrically insulating layers interleaved with conducting layers), each with different vias configurations. As shown in FIG. 3B, one layer of the antenna module 300B includes a set of vias 312 disposed at a distance 350 from a boundary of the antenna module. The distance 350 may be associated with an operational frequency of antenna elements 340 (e.g., a quarter wavelength, three-quarters wavelengths, etc.). The particular distance may mitigate resonant signals (e.g., electric and/or magnetic fields) such as RF radiation from the neighboring module.

As shown in FIGS. 3A-B, the circuit board may include vias in one or more layers that may span an entire dimension (e.g., height) of the circuit board. The arrangement of one or more vias at a distance 350 may be employed on one side of the antenna structure, two sides of the antenna structure, along an entire perimeter of the antenna structure, and anywhere in between, such as, for example, to mitigate degradation caused by inter-module gaps (e.g., a physical distance between antenna modules) through a portion (e.g., first side) of the antenna structure.

Figure 4A:
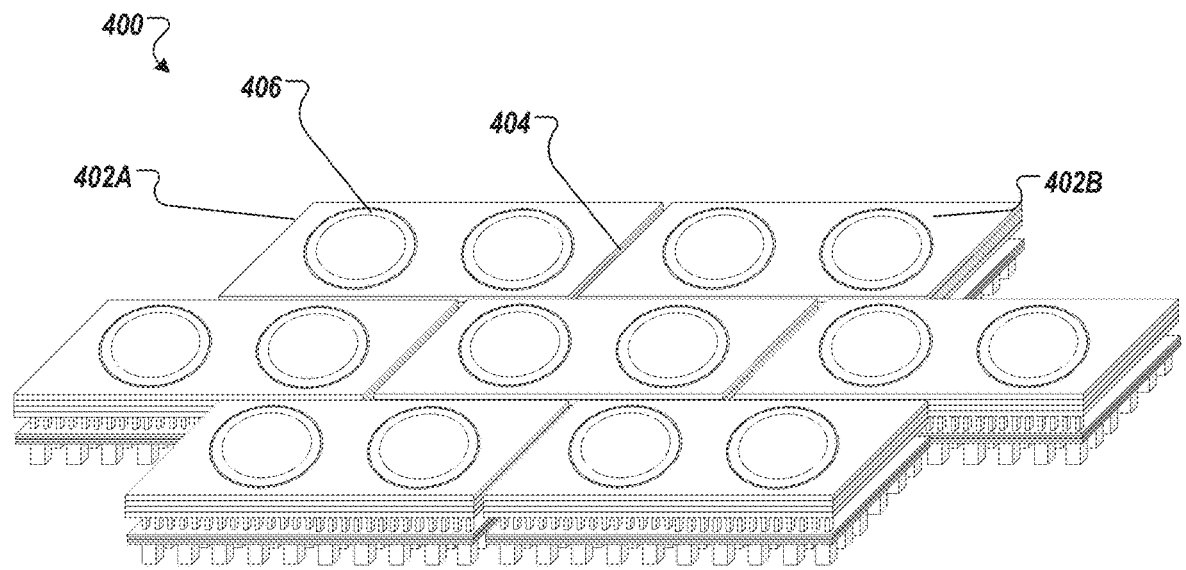
FIG. 4A illustrates an array of antenna modules according to at least one embodiment.

FIG. 4A illustrates an array of antenna modules according to at least one embodiment. As shown in FIG. 4A, antenna modules 402A-B may be arranged into an organized distribution of antenna modules, each incorporating one or more details of antenna modules described in association with FIGS. 1-3. The antenna modules may form inter-module gaps 404 between the adjacent modules.

In some embodiments, one or more antenna modules 402A-B may include layers with an arrangement of vias similar to those described in FIGS. 1B-C. In some embodiments, one or more antenna modules may only include boundary choke on sides adjacent to another antenna module. For example, one or more antenna modules may be disposed on an edge or boundary of an array of antenna modules and may only be adjacent to another antenna module on part of the perimeter of the antenna module. However, in other embodiments, the one or more antenna elements may uniformly provide an RF boundary choke along each edge of the entire perimeter of an antenna module.

In some embodiments, the one or more antenna elements 406 of antenna modules 402A-B may form a phased array antenna, as discussed below in association with FIG. 7. For example, each antenna element 406 may operate within a common frequency range and use a diversity of phase shifts to steer a main lobe of a transmission/receive signal beam.

In some embodiments, as discussed previously, the antenna modules may form a rectangular structure, as shown in FIG. 4A, however, in some embodiments, the antenna module may be of a different shape, such as a triangular structure, a pentagon structure, a hexagon structure (e.g., a honeycomb shape), and so forth. In some embodiments, the antenna modules may include uniform structures. However, in other embodiments, the antenna structure may include various combinations of sizes and shapes. For example, antenna modules may include rectangular and square structures in combination with one another. In some embodiments, the modules are separated by a uniform distance throughout the array.

As shown in FIG. 4A, a particular antenna module may form an inter-module gap with multiple antenna modules at a common edge of the particular antenna module. This may be achieved by staggering rows and/or columns of the array of antenna modules. For example, a first portion of an edge of a first antenna module may form an inter-module gap with a second antenna module, and a second portion of the edge of the first antenna module may form an inter-module gap with a third antenna module. Using an RF boundary choke for a given edge or boundary of a particular antenna module may effectively mitigate the effects of RF degradation caused by multiple antenna modules disposed proximate to the same boundary of the antenna module.

Figure 4B:
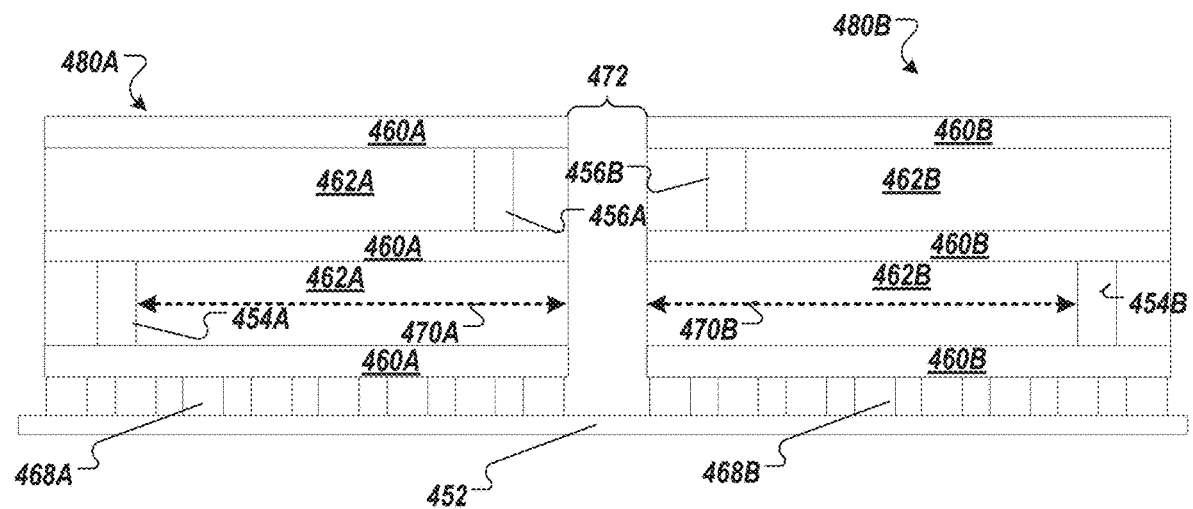
FIG. 4B illustrates a side view of a pair of antenna modules having boundary RF chokes according to at least one embodiment.

FIG. 4B illustrates a side view 450 of a pair of antenna modules 480A-B having boundary RF chokes according to at least one embodiment. As shown in FIG. 4B, a first antenna module 480A and a second antenna module 480B may be disposed on a support structure 452. In some embodiments, the support structure includes Printed Wiring Boards (PWBs) or Printed Circuit Boards (PCBs. In general, a PWB is similar to a PCB, but without any components installed on it). The antenna modules 480A-B may include surface-mount packaging 468A-B (e.g., solder ball, ball grid array (BGA), or the like) that couples one or more components of the antenna modules 480A-B to the support structure 452.

As shown in FIG. 4B, the antenna modules 480A-B may include interleaved conducting layers 460A-B (e.g., metals such as, for example, copper, aluminum, and/or iron) and electrically insulating layers 462A-B (e.g., substrate layers, air layers, dielectric layers, etc.). One or more of the electrically insulating layers 462A-B may include vias 454A-B, 456A-B. A first arrangement of vias may include vias 456A-B disposed proximate to an inter-module boundary 470. A second arrangement of vias 454A-B may be disposed at a distance 470A-B from the inter-module boundary. In some embodiments, the distance 470A-B corresponds to an operating frequency of one or more antennas of antenna modules 480A-B. For example, the distance 470A-B may be an integer multiple of a quarter wavelength or three-quarter wavelengths corresponding to the operating frequency of the antennas of the antenna modules. In some embodiments, the arrangement of vias 454A-B, 456A-B may include one or more details discussed in association with FIGS. 1B-C.

In some embodiments, the vias 454A-B positioned a distance 470A-B from inter-module gap 472 insulates 472 intra-module components (e.g., antenna elements, RFFE circuitry, vias coupled between the antenna elements and RFFE circuitry, etc.) from resonant signals propagating within the inter-module gap. For example, vias 454A-B collectively may form a quarter-wave RF choke along a boundary of the respective antenna modules 480A-B. In some embodiments, each antenna module 480A-B may form RF chokes on the same layer of the circuit board. However, in other embodiments, each antenna module may have a different layer that forms an RF choke. For example, the relative positioning (e.g., distance from inter-module 472) of vias 456B and 454B may be switched.

Figure 5:
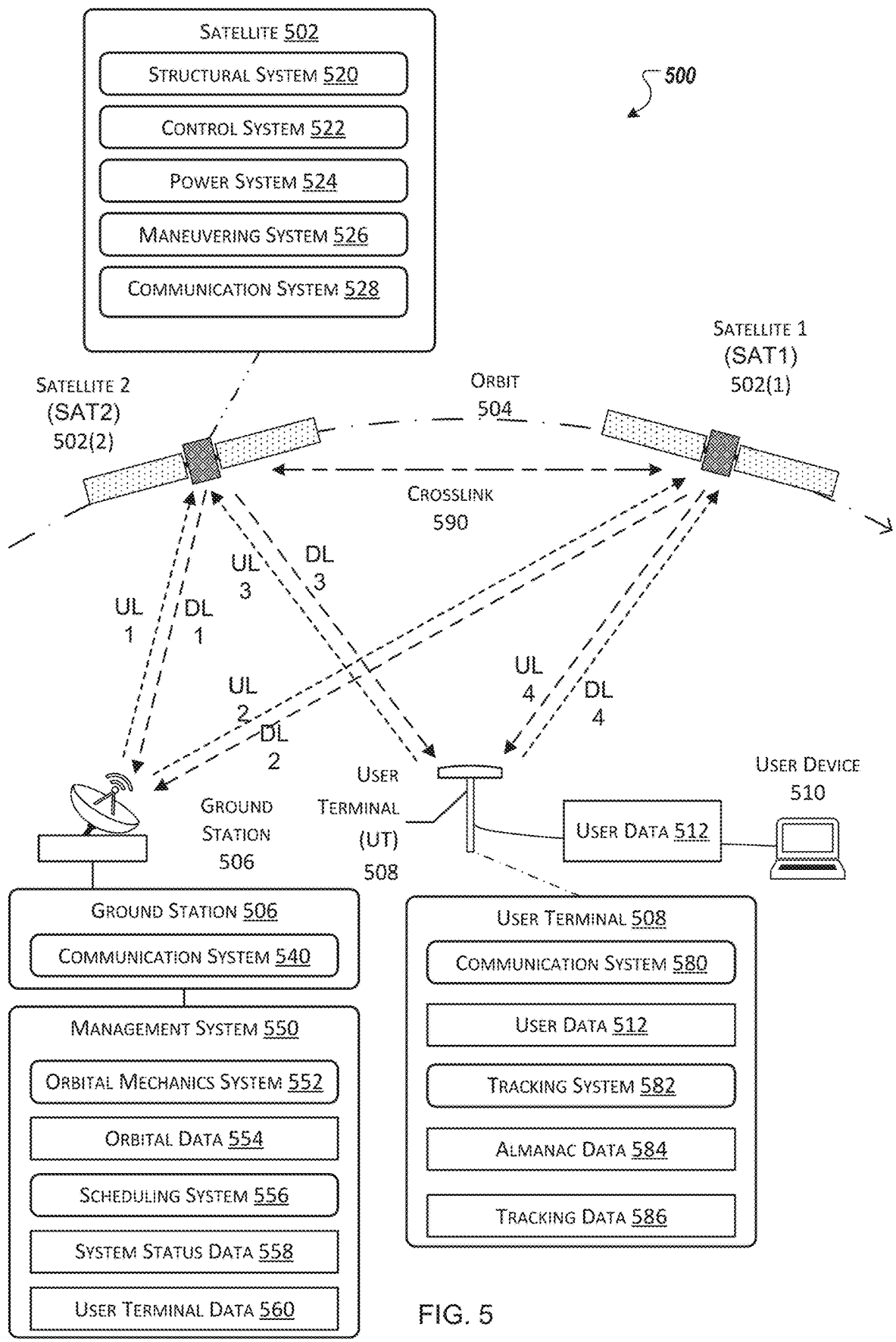
FIG. 5 illustrates a portion of a communication system that includes two satellites of a constellation of satellites, each satellite being in orbit, according to embodiments of the present disclosure.

FIG. 5 illustrates a portion of a communication system 500 that includes two satellites of a constellation of satellites 502(1), 502(2), . . . , 502(S), each satellite 502 being in orbit 504 according to embodiments of the present disclosure. The communication system 500 shown here comprises a plurality (or "constellation") of satellites 502(1), 502(2), . . . , 502(S), each satellite 502 being in orbit 504. Any of the satellites 502 can include the communication system that includes the antenna modules of FIGS. 1-4. Also shown is a ground station 506, user terminal (UT) 508, and a user device 510.

The constellation may comprise hundreds or thousands of satellites 502, in various orbits 504. For example, one or more of these satellites 502 may be in non-geosynchronous orbits (NGOs) in which they are in constant motion with respect to the Earth. For example, orbit 504 is a low earth orbit (LEO). In this illustration, orbit 504 is depicted with an arc pointed to the right. A first satellite (SAT1) 502(1) is leading (ahead of) a second satellite (SAT2) 502(2) in the orbit 504.

Satellite 502 may comprise a structural system 520, a control system 522, a power system 524, a maneuvering system 526, and a communication system 528 described herein. In other implementations, some systems may be omitted or other systems added. One or more of these systems may be communicatively coupled with one another in various combinations.

The structural system 520 comprises one or more structural elements to support the operation of satellite 502. For example, the structural system 520 may include trusses, struts, panels, and so forth. The components of other systems may be affixed to, or housed by, the structural system 520. For example, the structural system 520 may provide mechanical mounting and support for solar panels in the power system 524. The structural system 520 may also provide for thermal control to maintain components of the satellite 502 within operational temperature ranges. For example, the structural system 520 may include louvers, heat sinks, radiators, and so forth.

The control system 522 provides various services, such as operating the onboard systems, resource management, providing telemetry, processing commands, and so forth. For example, the control system 522 may direct the operation of the communication system 728.

The power system 524 provides electrical power for the operation of the components onboard satellite 502. The power system 524 may include components to generate electrical energy. For example, the power system 524 may comprise one or more photovoltaic cells, thermoelectric devices, fuel cells, and so forth. The power system 524 may include components to store electrical energy. For example, the power system 524 may comprise one or more batteries, fuel cells, and so forth.

The maneuvering system 526 maintains the satellite 502 in one or more of a specified orientation or orbit 504. For example, the maneuvering system 526 may stabilize satellite 502 with respect to one or more axes. In another example, the maneuvering system 526 may move the satellite 502 to a specified orbit 504. The maneuvering system 526 may include one or more computing devices, sensors, thrusters, momentum wheels, solar sails, drag devices, and so forth. For example, the sensors of the maneuvering system 526 may include one or more global navigation satellite system (GNSS) receivers, such as global positioning system (GPS) receivers, to provide information about the position and orientation of satellite 502 relative to Earth. In another example, the sensors of the maneuvering system 526 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 528 provides communication with one or more other devices, such as other satellites 502, ground stations 506, user terminals 508, and so forth. The communication system 528 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 502, ground stations 506, user terminals 508, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 528 may be output to other systems, such as to the control system 522, for further processing. Output from a system, such as the control system 522, may be provided to the communication system 528 for transmission.

One or more ground stations 506 are in communication with one or more satellites 502. The ground stations 506 may pass data between the satellites 502, a management system 550, networks such as the Internet, and so forth. The ground stations 506 may be emplaced on land, on vehicles, at sea, and so forth. Each ground station 506 may comprise a communication system 540. Each ground station 506 may use the communication system 540 to establish communication with one or more satellites 502, other ground stations 506, and so forth. The ground station 506 may also be connected to one or more communication networks. For example, the ground station 506 may connect to a terrestrial fiber optic communication network. The ground station 506 may act as a network gateway, passing user data 512 or other data between the one or more communication networks and the satellites 502. Such data may be processed by the ground station 506 and communicated via the communication system 540. The communication system 540 of a ground station may include components similar to those of the communication system 528 of a satellite 502 and perform similar communication functionalities. For example, the communication system 540 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 506 are in communication with a management system 550. The management system 550 is also in communication, via the ground stations 506, with the satellites 502 and the UTs 508. The management system 550 coordinates the operation of the satellites 502, ground stations 506, UTs 508, and other resources of the communication system 500. The management system 550 may comprise one or more of an orbital mechanics system 552 or a scheduling system 556. In some embodiments, the scheduling system 556 can operate in conjunction with an HD controller.

The orbital mechanics system 552 determines orbital data 554 that is indicative of a state of a particular satellite 502 at a specified time. In one implementation, the orbital mechanics system 552 may use orbital elements that represent characteristics of the orbit 504 of the satellites 502 in the constellation to determine the orbital data 554 that predicts location, velocity, and so forth of particular satellites 502 at particular times or time intervals. For example, the orbital mechanics system 552 may use data obtained from actual observations from tracking stations, data from the satellites 502, scheduled maneuvers, and so forth to determine the orbital elements. The orbital mechanics system 552 may also consider other data, such as space weather, collision mitigation, orbital elements of known debris, and so forth.

The scheduling system 556 schedules resources to provide communication to the UTs 508. For example, the scheduling system 556 may determine handover data that indicates when communication is to be transferred from the first satellite 502(1) to the second satellite 502(2). Continuing the example, the scheduling system 556 may also specify communication parameters such as frequency, timeslot, and so forth. During operation, the scheduling system 556 may use information such as the orbital data 554, system status data 558, user terminal data 560, and so forth.

The system status data 558 may comprise information such as which UTs 508 are currently transferring data, satellite availability, current satellites 502 in use by respective UTs 508, capacity available at particular ground stations 506, and so forth. For example, the satellite availability may comprise information indicative of satellites 502 that are available to provide communication service or those satellites 502 that are unavailable for communication service. Continuing the example, a satellite 502 may be unavailable due to malfunction, previous tasking, maneuvering, and so forth. The system status data 558 may be indicative of past status, predictions of future status, and so forth. For example, the system status data 558 may include information such as projected data traffic for a specified interval of time based on previous transfers of user data 512. In another example, the system status data 558 may be indicative of future status, such as a satellite 502 being unavailable to provide communication service due to scheduled maneuvering, scheduled maintenance, scheduled decommissioning, and so forth.

The user terminal data 560 may comprise information such as a location of a particular UT 508. The user terminal data 560 may also include other information such as a priority assigned to user data 512 associated with that UT 508, information about the communication capabilities of that particular UT 508, and so forth. For example, a particular UT 508 in use by a business may be assigned a higher priority relative to a UT 508 operated in a residential setting. Over time, different versions of UTs 508 may be deployed, having different communication capabilities such as being able to operate at particular frequencies, supporting different signal encoding schemes, having different antenna configurations, and so forth.

The UT 508 includes a communication system 580 to establish communication with one or more satellites 502. The communication system 580 of the UT 508 may include components similar to those of the communication system 528 of a satellite 502 and may perform similar communication functionalities. For example, the communication system 580 may include one or more modems, digital signal processors, power amplifiers, antennas (including at least one antenna that implements multiple antenna elements, such as a phased array antenna), processors, memories, storage devices, communications peripherals, interface buses, and so forth. The UT 508 passes user data 512 between the constellation of satellites 502 and the user device 510. The user data 512 includes data originated by the user device 510 or addressed to the user device 510. The UT 508 may be fixed or in motion. For example, the UT 508 may be used at a residence, or on a vehicle such as a car, boat, aerostat, drone, airplane, and so forth.

The UT 508 includes a tracking system 582. The tracking system 582 uses almanac data 584 to determine tracking data 586. The almanac data 584 provides information indicative of orbital elements of the orbit 504 of one or more satellites 502. For example, the almanac data 584 may comprise orbital elements such as "two-line element" data for the satellites 502 in the constellation that are broadcast or otherwise sent to the UTs 508 using the communication system 580.

The tracking system 582 may use the current location of the UT 508 and the almanac data 584 to determine the tracking data 586 for satellite 502. For example, based on the current location of the UT 508 and the predicted position and movement of the satellites 502, the tracking system 582 is able to calculate the tracking data 586. The tracking data 586 may include information indicative of azimuth, elevation, distance to the second satellite, time of flight correction, or other information at a specified time. The determination of the tracking data 586 may be ongoing. For example, the first UT 508 may determine tracking data 586 every 500 ms, every second, every five seconds, or at other intervals.

With regard to FIG. 5, an uplink is a communication link which allows data to be sent to satellite 502 from a ground station 506, UT 508, or a device other than another satellite 502. Uplinks are designated as UL1, UL2, UL3, and so forth. For example, UL1 is a first uplink from the ground station 506 to the second satellite 502(2). In comparison, a downlink is a communication link which allows data to be sent from satellite 502 to a ground station 506, UT 508, or device other than another satellite 502. For example, DL1 is a first downlink from the second satellite 502(2) to the ground station 506. The satellites 502 may also be in communication with one another. For example, a crosslink 590 provides for communication between satellites 502 in the constellation.

The satellite 502, the ground station 506, the user terminal 508, the user device 510, the management system 550, or other systems described herein may include one or more computing devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components. In one embodiment, the system memory stores instructions of methods to control the operation of the electronic device. The electronic device performs functions by using the processor(s) to execute instructions provided by the system memory. Embodiments may be provided as a software program or computer program including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 6:
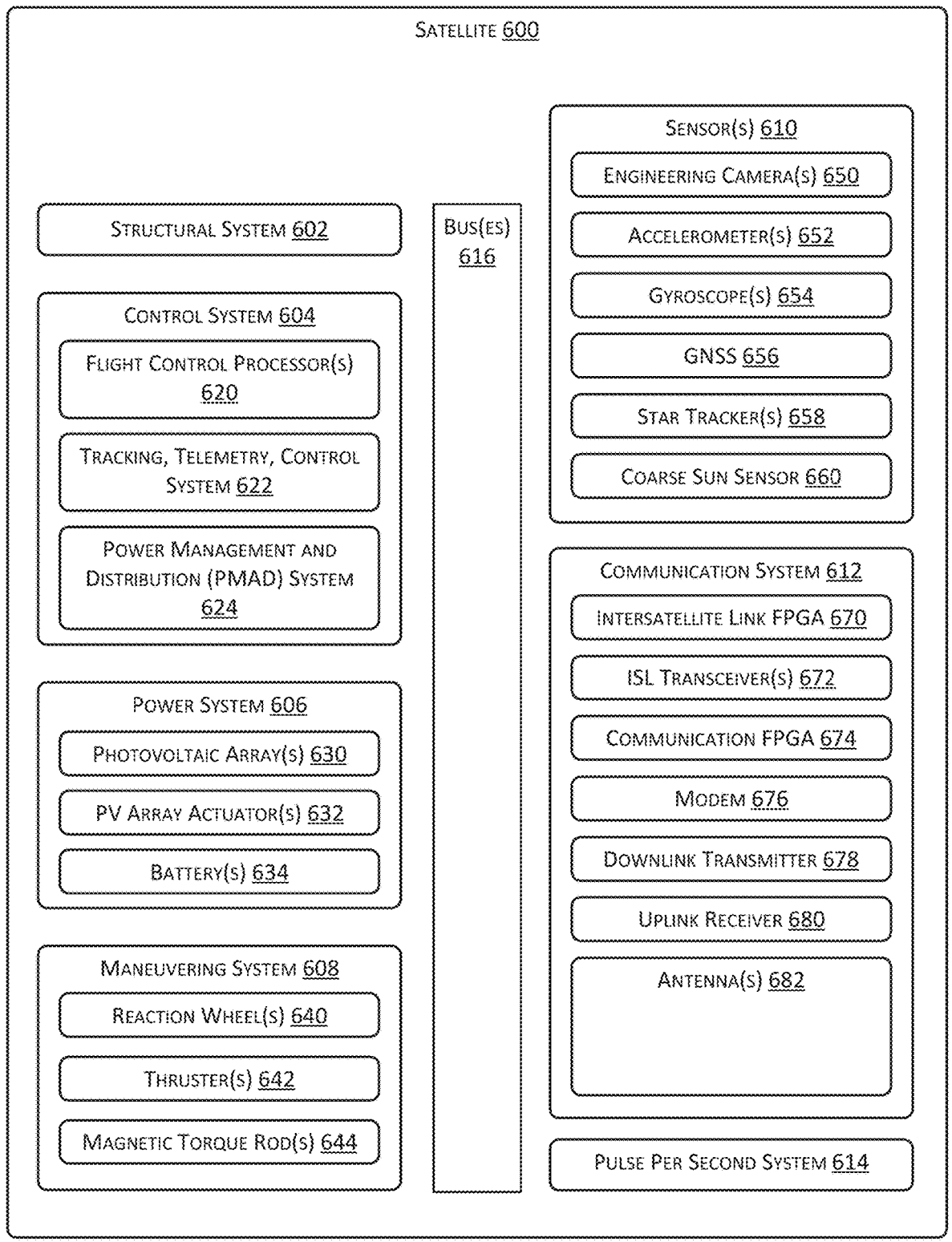
FIG. 6 is a functional block diagram of some systems associated with the satellite, according to some implementations.

FIG. 6 is a functional block diagram of some systems associated with satellite 502, according to some implementations. The satellite 502 may comprise a structural system 602, a control system 604, a power system 606, a maneuvering system 608, one or more sensors 610, and a communication system 612. A pulse per second (PPS) system 614 may be used to provide a timing reference to the systems onboard satellite 502. One or more busses 616 may be used to transfer data between the systems onboard satellite 502. In some implementations, redundant busses 616 may be provided. The busses 616 may include, but are not limited to, data busses such as Controller Area Network Flexible Data Rate (CAN FD), Ethernet, Serial Peripheral Interface (SPI), and so forth. In some implementations, the busses 616 may carry other signals. For example, a radio frequency bus may comprise a coaxial cable, waveguides, and so forth to transfer radio signals from one part of the satellite 502 to another. In other implementations, some systems may be omitted or other systems added. One or more of these systems may be communicatively coupled with one another in various combinations.

The structural system 602 comprises one or more structural elements to support the operation of satellite 502. For example, the structural system 602 may include trusses, struts, panels, and so forth. The components of other systems may be affixed to, or housed by, the structural system 602. For example, the structural system 602 may provide mechanical mounting and support for solar panels in the power system 606. The structural system 602 may also provide for thermal control to maintain components of the satellite 502 within operational temperature ranges. For example, the structural system 602 may include louvers, heat sinks, radiators, and so forth.

The control system 604 provides various services, such as operating the onboard systems, resource management, providing telemetry, processing commands, and so forth. For example, the control system 604 may direct the operation of the communication system 612. The control system 604 may include one or more flight control processors 620. The flight control processors 820 may comprise one or more processors, FPGAs, and so forth. A tracking, telemetry, and control (TTC) system 622 may include one or more processors, radios, and so forth. For example, the TTC system 622 may comprise a dedicated radio transmitter and receiver to receive commands from a ground station 506, send telemetry to the ground station 506, and so forth. Power management and distribution (PMAD) system 624 may direct the operation of the power system 606, control distribution of power to the systems of the satellite 502, control battery 634 charging, and so forth.

The power system 606 provides electrical power for the operation of the components onboard the satellite 502. The power system 606 may include components to generate electrical energy. For example, the power system 606 may comprise one or more photovoltaic arrays 630 comprising a plurality of photovoltaic cells, thermoelectric devices, fuel cells, and so forth. One or more PV array actuators 632 may be used to change the orientation of the photovoltaic array(s) 630 relative to the satellite 502. For example, the PV array actuator 632 may comprise a motor. The power system 606 may include components to store electrical energy. For example, the power system 606 may comprise one or more batteries 634, fuel cells, and so forth.

The maneuvering system 608 maintains the satellite 502 in one or more of a specified orientation or orbit 504. For example, the maneuvering system 608 may stabilize satellite 502 with respect to one or more axes. In another example, the maneuvering system 808 may move the satellite 502 to a specified orbit 504. The maneuvering system 608 may include one or more of reaction wheel(s) 640, thrusters 642, magnetic torque rods 644, solar sails, drag devices, and so forth. The thrusters 642 may include, but are not limited to, cold gas thrusters, hypergolic thrusters, solid-fuel thrusters, ion thrusters, arcj et thrusters, electrothermal thrusters, and so forth. During operation, the thrusters may expend propellant. For example, an electrothermal thruster may use water as a propellant, using electrical power obtained from the power system 606 to expel the water and produce thrust. During operation, the maneuvering system 608 may use data obtained from one or more of the sensors 610.

Satellite 502 includes one or more sensors 610. The sensors 610 may include one or more engineering cameras 650. For example, an engineering camera 650 may be mounted on satellite 502 to provide images of at least a portion of the photovoltaic array 630. Accelerometers 652 provide information about the acceleration of satellite 502 along one or more axes. Gyroscopes 654 provide information about the rotation of satellite 502 with respect to one or more axes. The sensors 610 may include a global navigation satellite system (GNSS) 656 receiver, such as a Global Positioning System (GPS) receiver, to provide information about the position of the satellite 502 relative to Earth. In some implementations, the GNSS 656 may also provide information indicative of velocity, orientation, and so forth. One or more star trackers 658 may be used to determine an orientation of satellite 502. A coarse sun sensor 660 may be used to detect the sun, provide information on the relative position of the sun with respect to satellite 502, and so forth. The satellite 502 may include other sensors 610 as well. For example, satellite 502 may include a horizon detector, radar, LIDAR, and so forth.

The communication system 612 provides communication with one or more other devices, such as other satellites 502, ground stations 506, user terminals 508, and so forth. The communication system 612 may include one or more modems 676, digital signal processors, power amplifiers, antennas 682 (including at least one antenna that implements multiple antenna elements, such as a phased array antenna such as the antenna elements 104A-B of FIG. 1A), processors, memories, storage devices, communications peripherals, interface buses, and so forth. Such components support communications with other satellites 502, ground stations 506, user terminals 508, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 612 may be output to other systems, such as to the control system 604, for further processing. Output from a system, such as the control system 604, may be provided to the communication system 612 for transmission.

The communication system 612 may include hardware to support the intersatellite link 590. For example, an intersatellite link FPGA 670 may be used to modulate data that is sent and received by an ISL transceiver 672 to send data between satellites 502. The ISL transceiver 672 may operate using radio frequencies, optical frequencies, and so forth.

A communication FPGA 674 may be used to facilitate communication between satellite 502 and the ground stations 506, UTs 508, and so forth. For example, the communication FPGA 674 may direct the operation of a modem 676 to modulate signals sent using a downlink transmitter 678 and demodulate signals received using an uplink receiver 680. The satellite 502 may include one or more antennas 682. For example, one or more parabolic antennas may be used to provide communication between satellite 502 and one or more ground stations 506. In another example, a phased array antenna may be used to provide communication between satellite 502 and the UTs 508.

Figure 7:
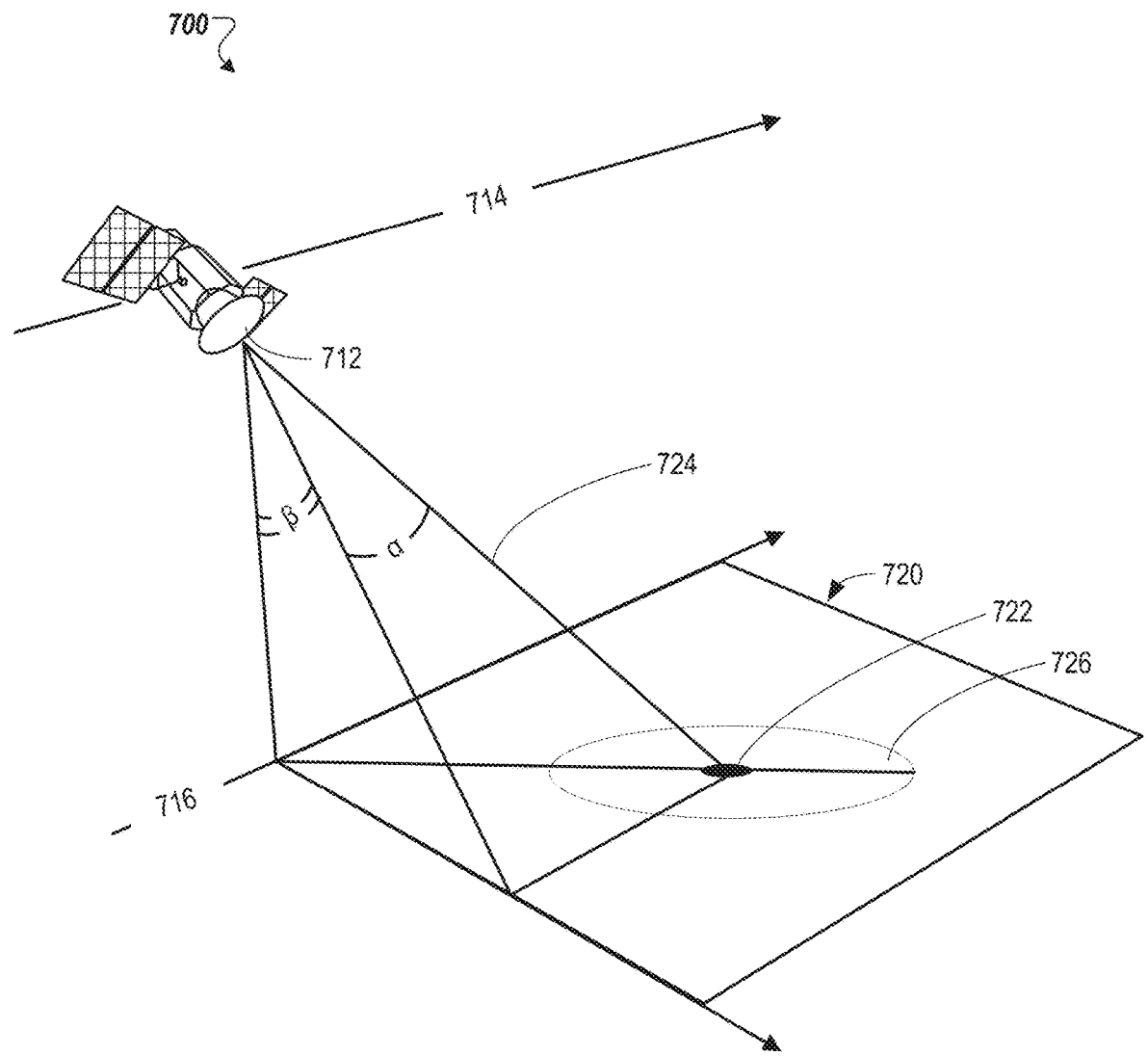
FIG. 7 illustrates a satellite including an antenna system that is steerable, according to embodiments of the present disclosure.

FIG. 7 illustrates the satellite 700 including an antenna system 712 that is steerable according to embodiments of the present disclosure. The satellite 700 can include the communication system with the antenna modules of FIGS. 1-4. The antenna system 712 may include multiple antenna elements that form an antenna that can be mechanically or electrically steered individually, collectively, or a combination thereof. In an example, the antenna is a phased array antenna.

In orbit 504, the satellite 700 follows a path 714, the projection of which onto the surface of the Earth forms a ground path 716. In the example illustrated in FIG. 7, the ground path 716 and a projected axis extending orthogonally from the ground path 716 at the position of the satellite 700, together define a region 720 of the surface of the Earth. In this example, the satellite 700 is capable of establishing uplink and downlink communications with one or more of ground stations, user terminals, or other devices within region 720. In some embodiments, region 720 may be located in a different relative position to the ground path 716 and the position of the satellite 700. For example, region 720 may describe a region of the surface of the Earth directly below satellite 700. Furthermore, embodiments may include communications between the satellite 700, an airborne communications system, and so forth.

As shown in FIG. 7, a communication target 722 (e.g., a ground station, a user terminal, or a CT (such as an HD CT)) is located within region 720. The satellite 700 controls the antenna system 712 to steer transmission and reception of communications signals to selectively communicate with the communication target 722. For example, in a downlink transmission from satellite 700 to the communication target 722, a signal beam 724 emitted by the antenna system 712 is steerable within an area 726 of the region 720. In some implementations, the signal beam 724 may include multiple subbeams. The extents of the area 726 define an angular range within which the signal beam 724 is steerable, where the direction of the signal beam 724 is described by a beam angle "α" relative to a surface normal vector of the antenna system 712. In two-dimensional phased array antennas, the signal beam 724 is steerable in two dimensions, as described in FIG. 7 by a second angle "β" orthogonal to the beam angle α. In this way, area 726 is a two-dimensional area within the region 720, rather than a linear track at a fixed angle determined by the orientation of the antenna system 712 relative to the ground path 716.

In FIG. 7, as the satellite 700 follows the path 714, the area 726 tracks along the surface of the Earth. In this way, the communication target 722, which is shown centered in the area 726 for clarity, is within the angular range of the antenna system 712 for a period of time. During that time, signals communicated between satellite 700 and the communication target 722 are subject to bandwidth constraints, including but not limited to signal strength and calibration of the signal beam 724. In an example, for phased array antenna systems, the signal beam 724 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 8:
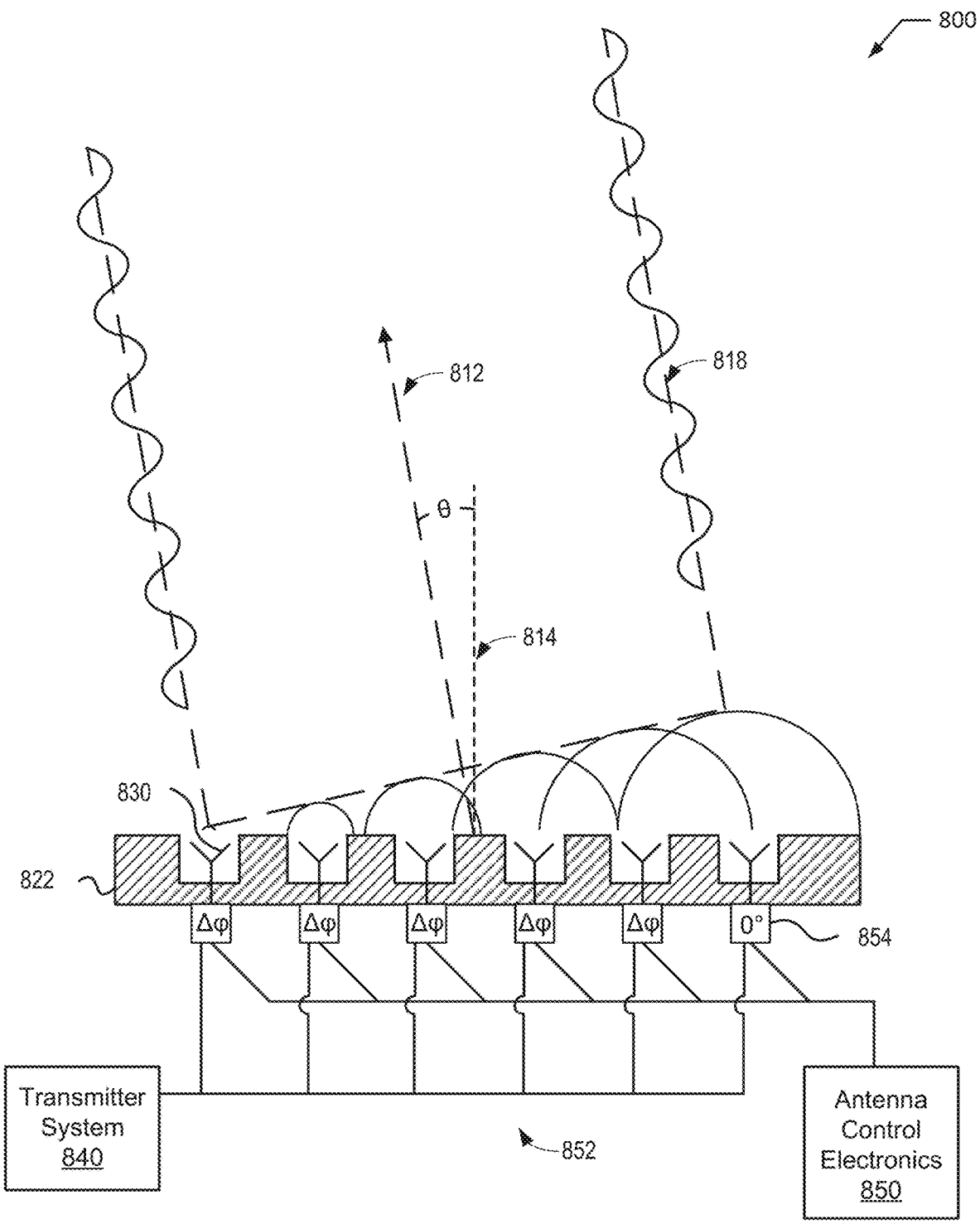
FIG. 8 illustrates a simplified schematic of an antenna, according to embodiments of the present disclosure.

FIG. 8 illustrates a simplified schematic of an antenna 800, according to embodiments of the present disclosure. The antenna 800 may be a component of the antenna system 712 of FIG. 7. As illustrated, the antenna 800 is a phased array antenna that includes multiple antenna elements 830 (e.g., antenna elements 104A-B in FIG. 1A). Interference between the antenna elements 830 forms a directional radiation pattern in both transmitter and receiver arrays forming a beam 810 (beam extents shown as dashed lines). The beam 810 is a portion of a larger transmission pattern (not shown) that extends beyond the immediate vicinity of the antenna 800. The beam 810 is directed along a beam vector 812, described by an angle "θ" relative to an axis 814 normal to a surface of the antenna 800. As described below, beam 810 is one or more of steerable or shapeable through control of operating parameters including, but not limited to a phase and an amplitude of each antenna element 830.

In FIG. 8, the antenna 800 includes, within a transmitter section 822, the antenna elements 830, which may include but are not limited to, omnidirectional transmitter antennas coupled to a transmitter system 840, such as the downlink transmitter 678. The transmitter system 840 provides a signal, such as a downlink signal to be transmitted to a ground station on the surface. The downlink signal is provided to each antenna element 830 as a time-varying signal that may include several multiplexed signals. To steer the beam 810 relative to the axis 814, the phased array antenna system includes antenna control electronics 850 controlling a radio frequency (RF) feeding network 852, including multiple signal conditioning components 854 interposed between the antenna elements 830 and the transmitter system 840. The signal conditioning components 854 introduce one or more of a phase modulation or an amplitude modulation (e.g., by phase shifters), as denoted by "Δφ" in FIG. 8, to the signal sent to the antenna elements 830. As shown in FIG. 8, introducing a progressive phase modulation produces interference in the individual transmission of each antenna element 830 that generates the beam 810.

The phase modulation imposed on each antenna element 830 can differ and can be dependent on a spatial location of a communication target that determines an optimum beam vector (e.g., where the beam vector 812 is found by one or more of maximizing signal intensity or connection strength). The optimum beam vector may change with time as the communication target 722 moves relative to the phased array antenna system.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A communication system comprising:
   a first circuit board that is electrically grounded;
   a first antenna module coupled to the first circuit board;
   a second antenna module coupled to the first circuit board and positioned proximate to the first antenna module, wherein a first edge of the first antenna module and a second edge of the second antenna module are separated by a physical distance that causes standing resonant fields at the first edge and the second edge, the standing resonant fields causing radio frequency (RF) degradation of RF signals communicated by the communication system;
   wherein the first antenna module comprises:
      a second circuit board comprising a first set of conducting layers interleaved with a first set of insulating layers;
      a first set of antennas disposed on a first surface of the second circuit board;
      radio frequency front-end (RFFE) circuitry disposed on a second surface of the second circuit board;
      a first set of vias extending between the first surface of the second circuit board and the second surface of the second circuit board, wherein each antenna of the first set of antennas is coupled to a via of the first set of vias, wherein at least some of the first set of vias are located at a first distance from the first edge; and
      an RF choke located along a first axis parallel to the first edge and at a second distance from the first edge to reduce the standing resonant fields and mitigate the RF degradation caused by the physical distance between the first antenna module and the second antenna module, the second distance being less than the first distance, the RF choke comprising a second set of vias each disposed within a first insulating layer of the first set of insulating layers, wherein each of the second set of vias is positioned along the first axis and the second distance from the first edge, the second distance corresponding to a quarter wavelength of an operating frequency of the first set of antennas.

2. The communication system of claim 1, wherein the second antenna module comprises:
   a third circuit board comprising a second set of conducting layers interleaved with a second set of insulating layers;
   a second set of antennas disposed on a first surface of the third circuit board;
   second RFFE circuitry disposed on a second surface of the third circuit board; and
   a third set of vias extending between the first surface of the third circuit board and the second surface of the third circuit board, wherein each antenna of the second set of antennas is coupled to a via of the third set of vias; and
   a second RF choke located along a second axis parallel to the second edge and at the second distance from the second edge to reduce the standing resonant fields and mitigate the RF degradation caused by the physical distance between the first antenna module and the second antenna module, the RF choke comprising a fourth set of vias each disposed in a second insulating layer of the second set of insulating layers, wherein each of the fourth set of vias is positioned along the second axis and the second distance from the second edge.

3. The communication system of claim 1, wherein the first antenna module further comprises a third set of vias located along a second axis parallel to the first edge and at a third distance from the first edge to form an RF shield between the first antenna module and the second antenna module, the third distance being less than the first distance and different from the second distance, wherein each of the third set of vias is disposed within a second insulating layer of the first set of insulating layers, wherein each of the third set of vias is positioned along the second axis and the third distance from the first edge.

4. A communication system comprising:
a support structure;
an antenna module coupled to the support structure, the antenna module comprising:
a circuit board having one or more conducting layers and one or more electrically insulating layers;
an antenna disposed on a first surface of the circuit board;
radio frequency front end (RFFE) circuitry disposed on a second surface of the circuit board;
a first set of vias extending between the first surface and the second surface, wherein the antenna is coupled to a via of the first set of vias;
a second set of vias disposed within the circuit board, wherein each of the second set of vias is positioned along a first axis parallel to and a first distance from a first edge of the antenna module, and wherein the second set of vias are not directly coupled to the antenna; and
a third set of vias disposed within the circuit board, wherein each of the third set of vias is positioned along a second axis parallel to and a second distance, different from the first distance, from the first edge of the antenna module, wherein the third set of vias is configured to shield the first set of vias from radio frequency (RF) interference.

5. The communication system of claim 4, wherein the first distance corresponds to a quarter wavelength of an operating frequency of the antenna.

6. The communication system of claim 4, wherein each of the second set of vias is positioned in a first electrically insulating layer and is coupled to a pair of conducting layers adjacent to the first electrically insulating layer.

7. The communication system of claim 6, wherein the first electrically insulating layer forms a rectangular surface having the first edge, a second edge, a third edge, and a fourth edge, wherein the communication system further comprises a third set of vias disposed within the circuit board, wherein the third set of vias are arranged in a plurality of lines, wherein each of the plurality of lines is parallel to and the first distance from one of the first edge, the second edge, or the third edge.

8. The communication system of claim 4, wherein the first axis extends between a second edge of the antenna module and a third edge of the antenna module, the third edge being opposite the second edge, wherein the second edge and the third edge are adjacent to the first edge.

9. The communication system of claim 8, further comprising a third set of vias disposed within the circuit board, wherein each of the third set of vias is positioned along a second axis parallel to and the first distance from the second edge of the antenna module, wherein the second axis extends between the first edge and a fourth edge of the antenna module, the fourth edge being opposite the first edge, wherein the second edge and the third edge are adjacent to the fourth edge.

10. The communication system of claim 4, wherein the antenna module further comprises a second antenna disposed on the first surface of the circuit board and a third set of vias coupled between the second antenna and the RFFE circuitry.

11. The communication system of claim 4, wherein the antenna is a patch antenna or part of a phased array antenna.

12. The communication system of claim 4, further comprising:
a second antenna module coupled to the support structure and disposed proximate to the antenna module, wherein the antenna module and the second antenna module are separated by a physical distance, wherein the second set of vias reduce standing resonant fields at the first edge.

13. A space vehicle comprising:
a chassis;
an antenna module coupled to the chassis, the antenna module comprising:
a circuit board comprising one or more conducting layers and one or more electrically insulating layers;
an antenna disposed on a first surface of the circuit board;
radio frequency front end (RFFE) circuitry disposed on a second surface of the circuit board;
a first set of vias extending between the first surface and the second surface, wherein the antenna is coupled to a via of the first set of vias;
a second set of vias disposed within the circuit board, wherein each of the second set of vias is positioned along a first axis parallel to and a first distance from a first edge of the antenna module, and wherein the second set of vias are not directly coupled to the antenna; and
a third set of vias disposed within the circuit board, wherein each of the third set of vias is positioned along a second axis parallel to and a second distance, different from the first distance, from the first edge of the antenna module, wherein the third set of vias is configured to shield the first set of vias from radio frequency (RF) interference.

14. The space vehicle of claim 13, wherein the first distance corresponds to a quarter wavelength of an operating frequency of the antenna.

15. The space vehicle of claim 13, wherein each of the second set of vias is positioned in a first electrically insulating layer and is coupled to a pair of conducting layers adjacent to the first electrically insulating layer.

16. The space vehicle of claim 13, wherein the first axis extends between a second edge of the antenna module and a third edge of the antenna module, the third edge being opposite the second edge, wherein the second edge and the third edge are adjacent to the first edge.

17. The space vehicle of claim 16, further comprising a third set of vias disposed within the circuit board, wherein each of the third set of vias is positioned along a second axis parallel to and the first distance from the second edge of the antenna module, wherein the second axis extends between the first edge and a fourth edge of the antenna module, the fourth edge being opposite the first edge, wherein the second edge and the third edge are adjacent to the fourth edge.

18. The space vehicle of claim 13, wherein the antenna is a patch antenna or part of a phased array antenna.

\* \* \* \* \*